United States Patent [19]

Miyashita

[11] Patent Number: 5,397,883

[45] Date of Patent: Mar. 14, 1995

[54] AUTOMATIC TICKET-EXAMINING APPARATUS FOR MORE THAN ONE MEDIUM

[75] Inventor: Takehiko Miyashita, Yokohama, Japan

[73] Assignee: Kabushiki Kaisha Toshiba, Kawasaki, Japan

[21] Appl. No.: 174,029

[22] Filed: Dec. 28, 1993

[30] Foreign Application Priority Data

Dec. 28, 1992 [JP] Japan .................................. 4-349326
Dec. 17, 1993 [JP] Japan .................................. 5-318399

[51] Int. Cl.⁶ .............................................. G06K 5/00
[52] U.S. Cl. ..................................... 235/382; 235/380; 235/492
[58] Field of Search ......................... 235/380, 382, 492

[56] References Cited

U.S. PATENT DOCUMENTS

4,822,990  4/1989  Tamada et al. ..................... 235/492

Primary Examiner—Harold Pitts
Attorney, Agent, or Firm—Cushman Darby & Cushman

[57] ABSTRACT

An automatic gate apparatus for processing a first medium and a second medium, the first medium storing first information to pass said automatic gate apparatus, the second medium storing second information to pass said automatic gate apparatus, the first information being read by contacting with said automatic gate apparatus and the second information being transmitted by not contacting with said automatic gate apparatus, said automatic gate apparatus comprising a slot for accepting the first medium to read the first information, means for sensing existence of the second medium, means for obstructing said slot not to accept the first medium in response to the sense of said sensing means, and means for receiving the second information from the second medium in response to the sense of said sensing means by not contacting with the second medium.

12 Claims, 7 Drawing Sheets

AUTOMATIC TICKET-EXAMINING APPARATUS FOR MORE THAN ONE MEDIUM

BACKGROUND OF THE INVENTION

1. Field of the Invention

This invention relates to an automatic ticket-examining apparatus capable of dealing with, for example, both magnetic tickets and radio tickets.

2. Description of the Related Art

In recent railroads, to save labor in punching, examining, or collecting tickets at the gates, automatic ticket-examining equipment has been installed at the entrances and exits of stations. The equipment is designed to take in passengers' magnetic tickets (including commuter passes) to check for their validity and, if it is found that the ticket is invalid, prohibit the passenger from entering or leaving the station.

This type of automatic ticket-examining apparatus determines whether or not the passenger is allowed to pass on the basis of the encoded ticket information magnetically recorded on the ticket inserted in the slot when he or she passes through the ticket gate for entering or leaving the station or transferring.

An automatic ticket-examining apparatus has been developed which receives the ticket information from the tickets by radio without taking them in one by one and on the basis of the information received, determines whether or not the passengers are allowed to pass through the ticket gate.

Another automatic ticket-examining apparatus has been proposed which can handle both magnetic tickets on which the encoded ticket information is magnetically recorded and radio tickets capable of transmitting the ticket information by radio and provide automatic ticket examination of both types of tickets. In the automatic ticket-examining apparatus dealing with both magnetic and radio tickets, the processing method must be changed depending on which type of ticket the passenger passing through the gate has.

Conventional automatic ticket-examining equipment capable of dealing with both magnetic and radio tickets, however, has a problem: when a passenger with a magnetic ticket is immediately followed by a passenger with a radio ticket or vice versa, an error can take place in processing the tickets.

For example, it is assumed that a passenger with a magnetic ticket is immediately followed by a passenger with a radio ticket. If the radio ticket is sensed immediately before the magnetic ticket is inserted in the automatic ticket-examining apparatus, the apparatus will determine erroneously that the passenger with the radio ticket is before the passenger with the magnetic ticket.

Similarly, in a case where a passenger with a radio ticket is immediately followed by a passenger with a magnetic ticket, if the magnetic ticket is inserted in the automatic ticket-examining apparatus before the ticket information on the radio ticket has been read, the magnetic ticket is processed first. This is because the slot shutter for magnetic tickets cannot be closed until the ticket information on the radio ticket has been read properly.

In such cases, although a passenger can pass through the gate unconditionally, the immediately following passenger who is a real owner of the actually processed ticket cannot pass through the gate.

Further, there may a case where by unintentionally bringing a radio ticket close to the automatic ticket-examining apparatus, the electromagnetic wave from the ticket can be sensed by the apparatus. As a result, the apparatus can operate erroneously or write unnecessary data onto the radio ticket.

SUMMARY OF THE INVENTION

The object of the present invention is to provide an automatic ticket-examining apparatus capable of reliably performing the processing according to types of cards and ensuring a stable operation.

The foregoing object is accomplished by providing an automatic gate apparatus for processing a first medium and a second medium, the first medium storing first information to pass the automatic gate apparatus, the second medium storing second information to pass the automatic gate apparatus, the first information being read by contacting with the automatic gate apparatus and the second information being transmitted by not contacting with the automatic gate apparatus, the automatic gate apparatus comprising: a slot for accepting the first medium to read the first information; means for sensing existence of the second medium; means for obstructing the slot not to accept the first medium in response to the sense of the sensing means; and means for receiving the second information from the second medium in response to the sense of the sensing means by not contacting with the second medium.

With this configuration, when a radio card is brought close to the sensing means, the sensing means senses the second medium (ex. radio card), causing the obstructing means to obstruct the receiving means to receive the first medium (ex. a magnetic card). This allows the processing of the second medium to have priority over the processing of the first medium, which enables the medium processing apparatus to process medium without confusing their types.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Hereinafter, an embodiment of the present invention will be described, referring to the accompanying drawings.

Figure 1:
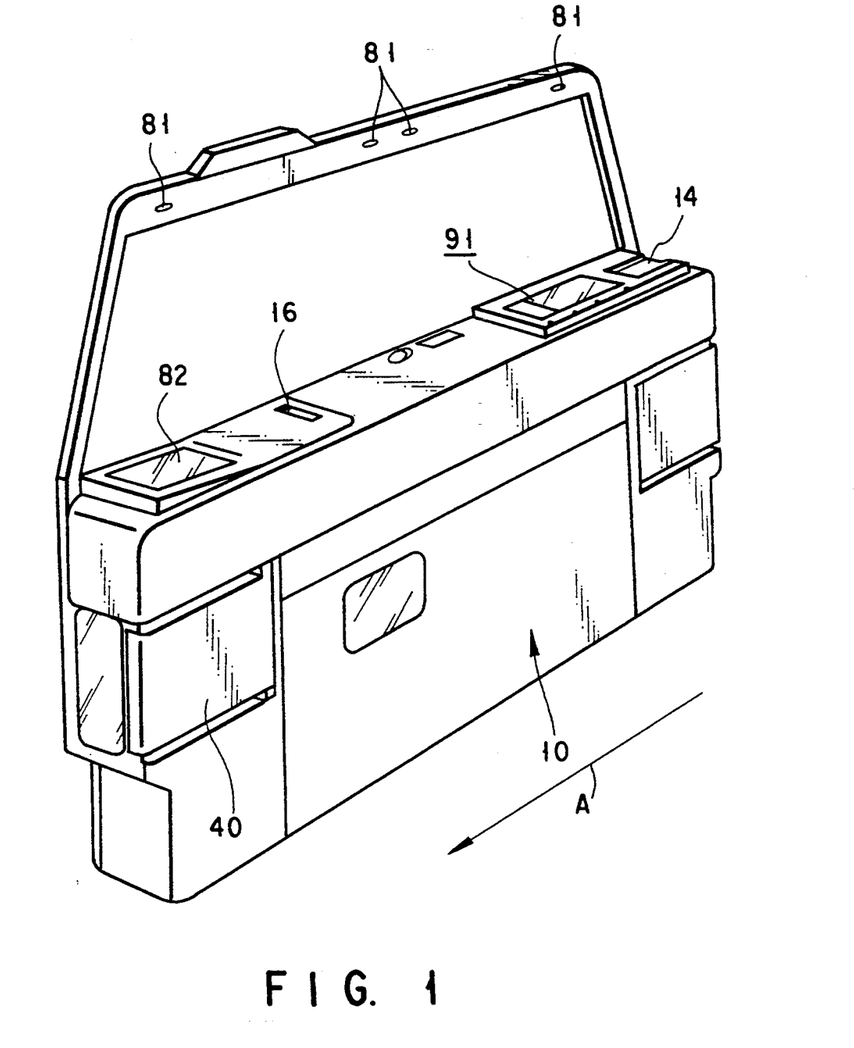
FIG. 1 is a schematic perspective view of an automatic ticket-examining apparatus according to an embodiment of the present invention.

FIG. 1 show the construction of an automatic ticket-examining apparatus which is formed at an entrance and exit of a station according to the present invention.

At upper surface of one end of the body 10 of an automatic ticket-examining apparatus, there is provided a ticket slot 14 in which a magnetic ticket (hereinafter, referred to as a magnetic commuter pass), such as a commuter pass on which encoded ticket information including the term of validity and the commuting section are magnetically recorded, is put. At upper surface of the other end, there is provided an ticket outlet 16 from which the magnetic commuter pass taken in at the ticket slot 14 is discharged. As an arrow sign A, an user person is guided and goes in or goes out from the station.

Arranged between the slot 14 and exit 16 is an antenna section 91 which receives the ticket information from a commuter pass (hereinafter a radio commuter pass) that transmits ticket information including the term of validity for an electric train and the commuting section by radio.

In the figure, numeral 40 indicates a door section provided so as to be able to open and close, 81 a person sensor for sensing the passage of a person, and 82 a passenger guide section which informs the passenger whether he or she can pass or not.

Figure 2:
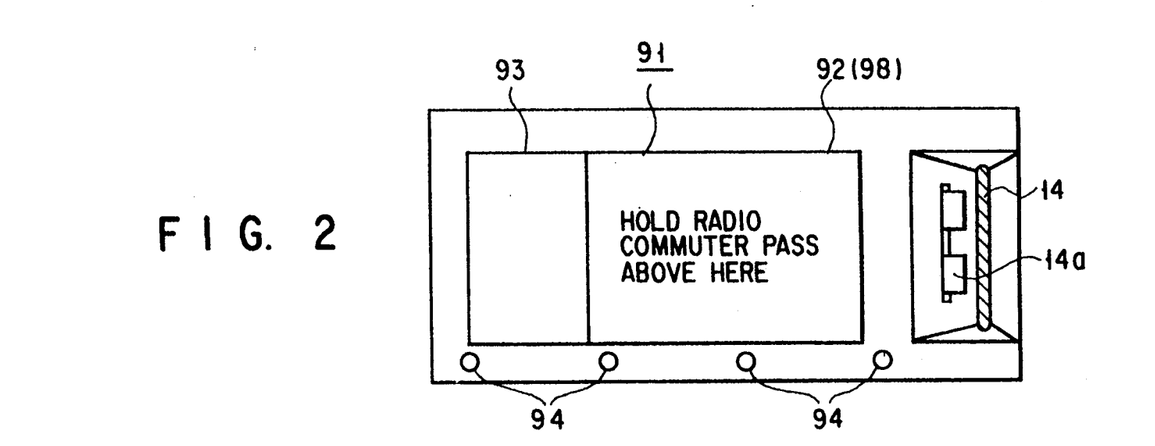
FIGS. 2 and 3 are views of the ticket slot and the antenna section of the automatic ticket-examining apparatus of the embodiment.
Figure 3:
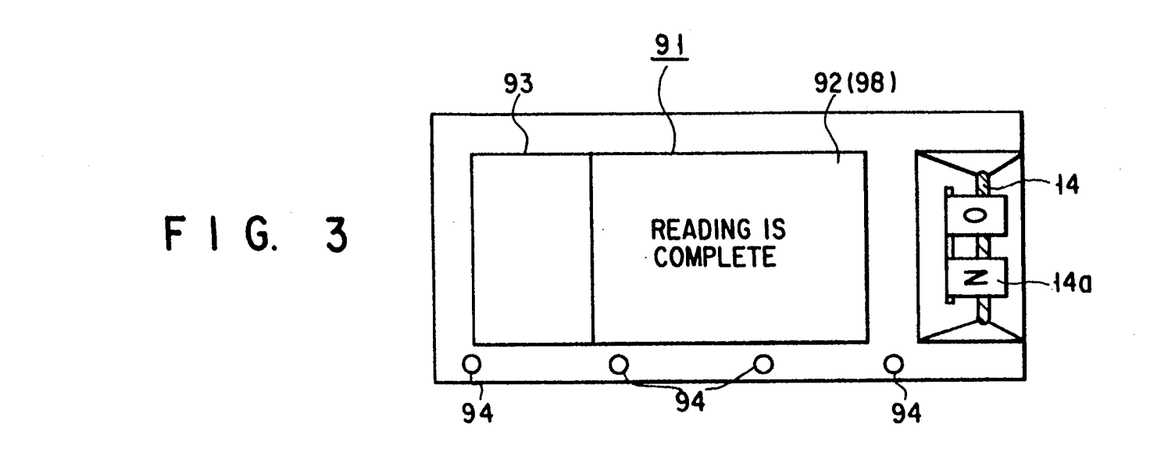

FIGS. 2 and 3 schematically show the construction of the ticket slot 14 and the antenna section 91.

The ticket slot 14 is for accepting magnetic commuter passes that passengers have. Near the slot, a slot shutter 14a for prohibiting a ticket from being put in is provided movably.

The antenna section 91, where a transmission/reception radio antenna for radio communication with the radio ticket is located, comprises a display unit 92 which indicates a message to instruct the passenger how to handle the radio commuter pass, a display unit 93 which indicates whether the ticket information from the radio commuter pass has been read or not, and a plurality of proximity sensors 94 for sensing whether a radio commuter pass comes close to the antenna section 91.

The proximity sensors 94 are provided plurality of lights and sensors, and the lights radiate in the vertical direction against the upper aspect of the body. The sensors detects the object (it is a radio commuter pass) when the sensor catches the reflected light in the predetermined time. The proximity sensor 94 have plurality of sensors along the direction of arrow sign A, and each sensor are formed at the interval which is shorter than shortest length of the radio commuter pass). It is that, when plurality of sensors detect the radio commuter pass simultaneously, the proximity sensor 94 judge the radio commuter pass existing on the proximity sensor 94. And, it is possible that the proximity sensor is supersonic waves sensor which radiates the supersonic waves and detects it, or an infrared rays sensor which detects the infrared rays.

Figure 4:
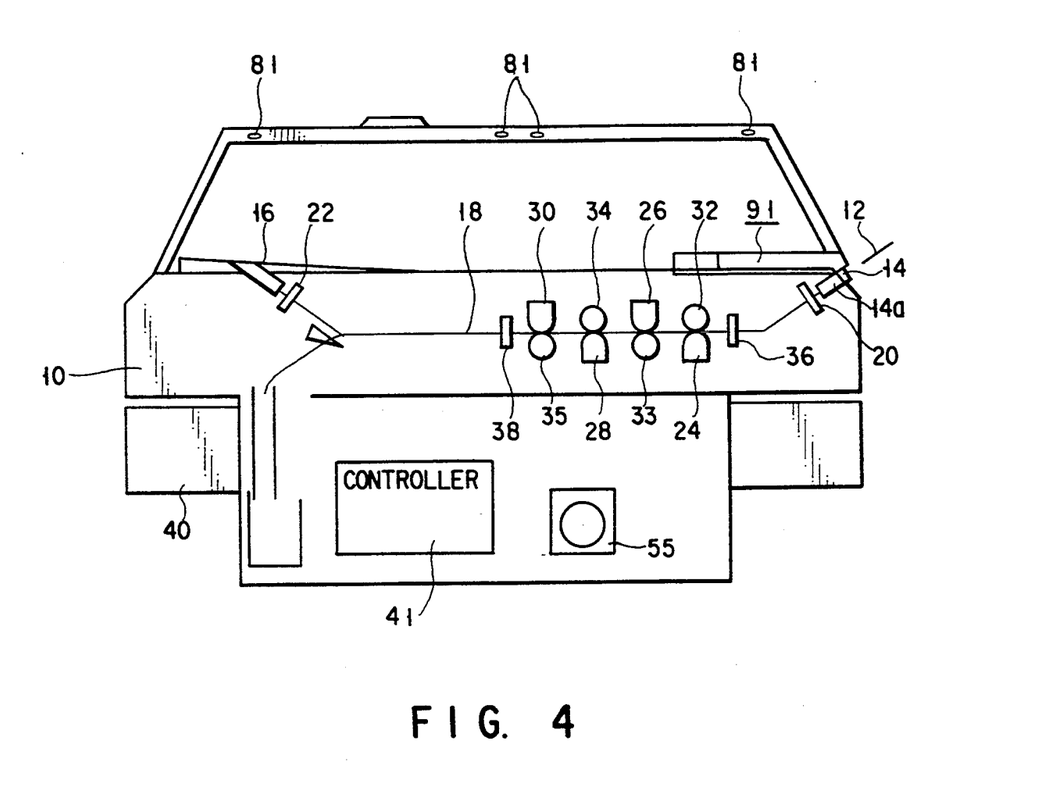
FIG. 4 schematically shows the internal arrangement of the automatic ticket-examining apparatus of the embodiment.

FIG. 4 schematically shows the internal arrangement of the body of the automatic ticket-examining apparatus 10.

A transport path 18 for conveying a magnetic commuter pass 12 taken in at the slot 14 to the outlet 16 is formed between the slot 14 and the outlet 16.

The slot 14 is provided with a sensor 20 that senses whether a magnetic commuter pass 12 is inserted, in addition to the slot shutter 14a. The outlet 16 is provided with a sensor 22 for sensing whether the magnetic commuter pass 12 is discharged. And the controller for controlling each devices and a carry motor 55 for carry the magnetic pass are provided.

Magnetic information reading sections (magnetic heads) 24 and 26 for reading the ticket information magnetically recorded on the pass 12 and magnetic information recording sections (magnetic heads) 28 and 30 for magnetically recording information on the pass 12 are provided between the slot 14 and the outlet 16 along the transport path 18.

On the opposite side of the magnetic information reading sections 24 and 26 and the magnetic information recording sections 28 and 30 along the transport path 18, support members (rollers) 32, 33, 34, and 35 are provided respectively.

The magnetic information reading section 24 and magnetic information recording section 28 are actuated when the magnetic commuter pass 12 is put in the slot 14 with its magnetic recording section facing the side on which the reading section 24 and the recording section 28 are. Whereas the magnetic information reading section 26 and the magnetic information recording section 30 are actuated when the pass 12 is inserted in the slot with its recording section facing the side on which the reading section 26 and the recording section 30 are located.

Also on the transport path 18, sensors 36 and 38 for sensing the passing of the magnetic commuter pass 12 being conveyed.

Figure 5:
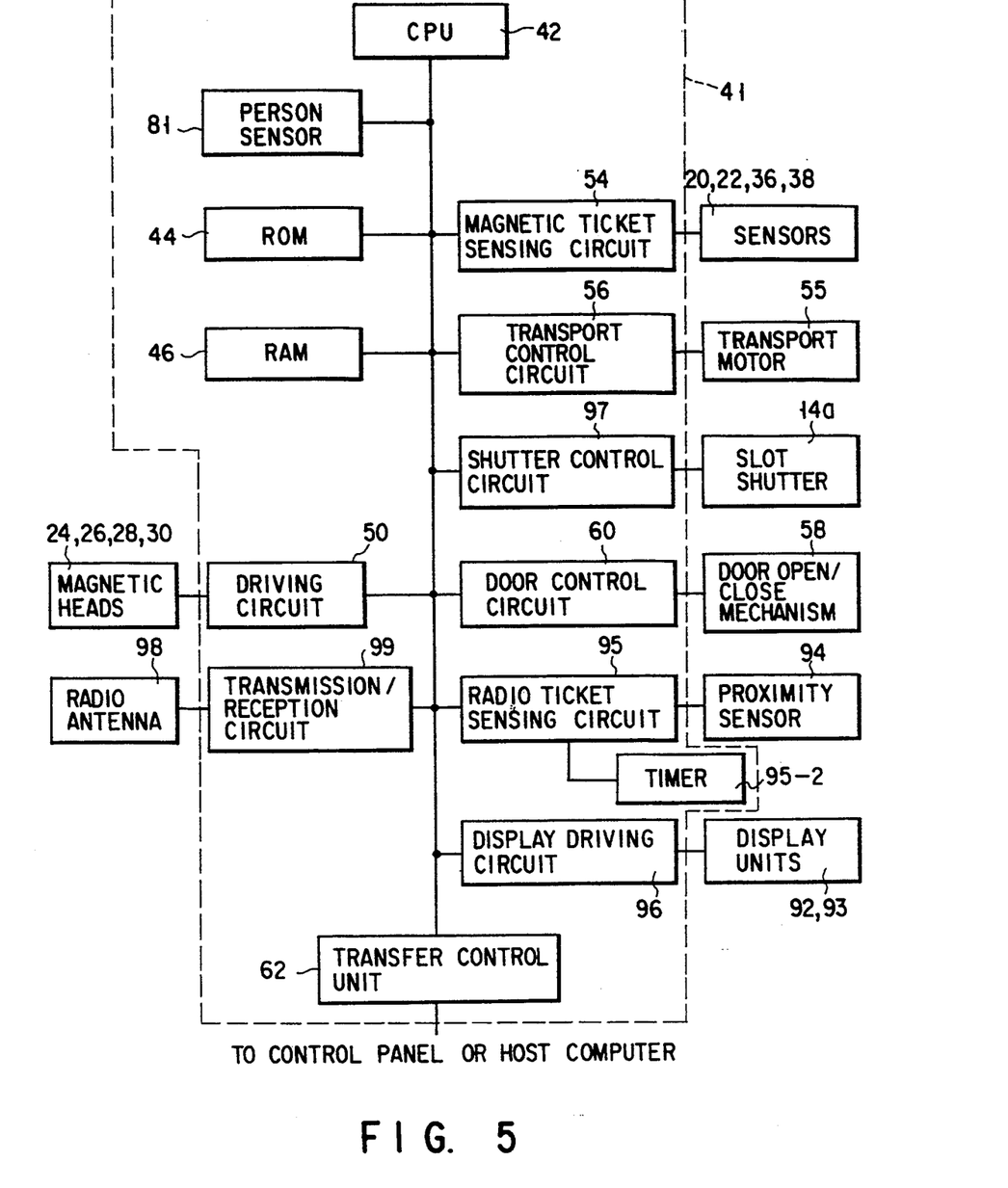
FIG. 5 is a block diagram of the control system of the automatic ticket-examining apparatus of the embodiment.

FIG. 5 is a block diagram of the control system of the automatic ticket-examining apparatus.

The control system of the automatic ticket-examining apparatus comprises controller 41 and plurality of control devices. The controller 41 comprises: a central processing unit (hereinafter, referred to as a CPU) 42 for controlling the entire apparatus; a read only memory (hereinafter, referred to as a ROM) 46 for storing a control program for the CPU 42 and a reference data for judging inspection information of ticket, it is date and code of the station in which the apparatus is provided; a random access memory (hereinafter, referred to as a RAM) which stores the ticket information read from the magnetic commuter pass 12 and which functions for the control program; a driving circuit 50 for controlling the magnetic information reading sections 24 and 26 and the magnetic information recording sections 28 and 30; a magnetic ticket sensing circuit 54 for detecting the transport state of the magnetic commuter pass 12 on the basis of the outputs of the sensors 20, 22, 36, and 38, a transport control circuit 56 for controlling a transport motor 55 that conveys the magnetic commuter pass 12 along the transport path 18, a door control circuit 60 for controlling a door open/close mechanism 58 that actuates the door section 40, and a transfer control section which exchanges information with a control panel (not shown) for controlling the body 10 of the automatic ticket-examining apparatus or the host computer.

The CPU 42 is connected to a radio ticket sensing circuit 95 for sensing whether a radio ticket comes close to the antenna section 91 on the basis of the outputs of the person sensor 81 and the proximity sensors 94, a timer 95-2, a display driving circuit 96 for activating the display units 92 and 93; a shutter control circuit 97 for controlling the opening/closing of the slot shutter 14a, and a transmission/reception circuit 99 for controlling the radio communication via a radio antenna 98. The person sensor 81 receives light which is radiated from the same shaped automatic gate apparatus (not shown) provided at opposite side of the user passage. The sensor detects existence of user in the passage by the crossing of the light.

The operation of the apparatus thus constructed will be explained.

Figure 6:
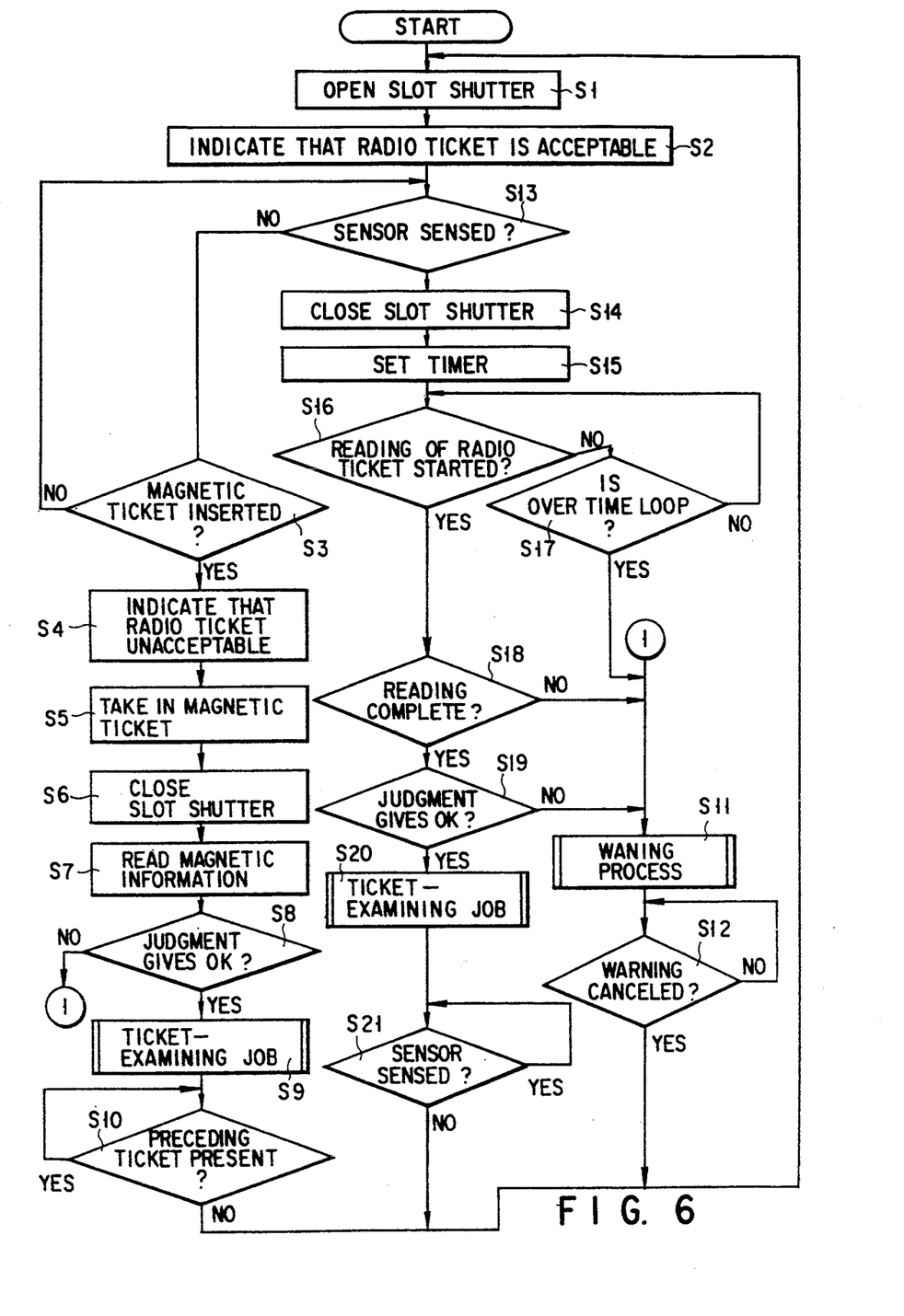
FIG. 6 is a flowchart for the operation of the automatic ticket-examining apparatus of the embodiment.

FIG. 6 is a flowchart of the processing in the automatic ticket-examining apparatus.

For example, it is assumed that a start instruction is received via the transfer control circuit 62 from the control panel (not shown) or the host computer.

Then, after initialization, the CPU 42 controls the shutter control circuit 97 to cause the slot shutter 14a of the ticket slot 14 to open (S1) (FIG. 2) and allow the passenger to put in the magnetic commuter pass 12.

The CPU also controls the display driving circuit 96 to cause the display unit 92 to display a message, e.g. "please show a radio ticket on here", to notify the passenger that the radio commuter pass can be accepted (S2) (FIG. 2).

It is assumed that in this state, the insertion of the magnetic commuter pass 12 in the slot 14 is detected by the magnetic ticket sensing circuit 54 using the sensor 20 (S3).

Then, the CPU controls the display driving circuit 96 to erase the message on the display unit 92 or display the message "Unacceptable" to tell the passenger that the radio commuter pass cannot be accepted (S4).

Next, the CPU controls the transport control circuit 56 to drive the transport motor 55, which then conveys the magnetic commuter pass 12 put in the slot 14 at a constant speed on the transport path 18 toward the outlet 16 (S5).

When the taking in of the pass is detected at the magnetic ticket sensing circuit 54 on the basis of the output of the sensor 20, the CPU controls the shutter control circuit 97 to close the slot shutter 14a (S6).

In this way, the driving circuit 50 causes either of the magnetic information reading sections 24 and 26 to read the ticket information from the magnetic commuter pass 12 being carried on the transport path 18. The CPU 42 compares the read inspection information of ticket with reference data memorized in RAM 46, the information thus read is used to determine whether the passenger should be allowed to pass or not (S7). It is that, the CPU 42 judges whether the effective period in the read inspection information includes that data, the effective division includes that station or not. If the effective period includes that data and the effective division include that station, the CPU would judge the magnetic pass is good and allow the pass of user.

For example, when it is judged that use of the magnetic commuter pass 12 is valid, ticket-examination operation is effected in such a manner that the driving circuit 50 causes either of the magnetic information recording sections 28 and 30 to write the necessary information on the magnetic recording section of the magnetic commuter pass 12, and the door control circuit 60 controls the door open/close mechanism 58 to open the door section 40 (S9).

After the preceding magnetic commuter pass 12 has been discharged (S10), the magnetic commuter pass 12 is then discharged from the outlet 16 to return the pass to its owner. Then, the door section 40 is closed and control goes back to the first process (S1).

For example, when the pass 12 has been expired or used outside the commuting section, it is judged that the passing cannot be allowed (S8). In this case, the door control circuit 60 controls the door open/close mechanism 58 to cause the door section 40 to remain closed and the passenger guide section 82 to inform the passenger that the passing is prohibited or to perform a warning process such as alerting the attendant (S11).

Then, the magnetic commuter pass 12 is discharged from the outlet 16 to return it to it owner prohibited from passing. After this, for example, when the person sensor 81 has sensed that the passenger has retreated from the passage of the apparatus (S12), control returns to the first process (S1).

In a state where the shutter 14a of the slot 14 is open and ready to accept a magnetic commuter pass 12 (S1) and a message appears on the display unit 92 to show that a radio commuter pass can be accepted (S2), it is assumed that the radio ticket sensing circuit 95 has sensed that the approach of an object to the antenna section 91 on the basis of the output of the proximity sensor 94 before the magnetic ticket sensing circuit 54 has sensed the insertion of a magnetic commuter pass 12 on the basis of the output of the sensor 20 (S13).

Specifically, according to the message on the display unit 92 of the antenna section 91, a radio commuter pass is held above the radio antenna 98. Then, the proximity sensors 94 sense it. The CPU then controls the display driving circuit 96 to erase the message on the display unit 92. At the same time, the CPU controls the shutter control circuit 97 to close the slot shutter 14a to prevent a magnetic commuter pass 12 from being put in (S14) (FIG. 3).

While the proximity sensors 94 are sensing an object that seems to be a radio commuter pass, the CPU controls the transmission/reception circuit 99 to enable the radio antenna 98 to read the ticket information from the radio commuter pass (S15).

If any ticket information cannot be read even after a certain period of time (approximately five seconds) since the timer was started when the proximity sensors 94 sensed the object, the CPU 42 judges that something is wrong with the reading or that the object is not a radio commuter pass (S17).

The CPU 42 also controls the display driving circuit 96 to display the message "Invalid reading" on the display unit 92.

In this way, with a conventional automatic ticket-examining machine with a reception system for radio cards, a card cannot be recognized at all even if it is put close to the machine, until the ticket information on the radio card has not been read correctly. Thus, it is impossible to make use of the visual or audio guide means provided for passengers.

With an approach-verifying means of the present invention, it is possible to regard a radio card whose information has not been read during a certain period of time as invalid and give the owner a message that the card cannot be used (S11).

After the reading of the ticket information has been completed, the CPU controls the display driving circuit 96 to display a message that the reading is complete on the display unit 93 (S18) (FIG. 3).

Even when the ticket information has been read correctly and it is judged that the passage is not allowed, the warning process is performed similarly.

When it is judged on the basis of the ticket information on the radio commuter pass that use of the radio commuter pass is valid (S19), the CPU controls the transmission/reception circuit 99 to store the necessary information on the radio commuter pass via the radio antenna 98, or controls the door control circuit 60 to cause the door open/close mechanism to open the door section 40 (S20).

A specified period of time after the radio commuter pass has gotten out of the area of the radio antenna 98, the door section 40 is closed and control returns to the first process (S21).

In this way, the ticket information on a radio commuter pass is not read until the approach of an object to the antenna section 91 is sensed. At the time when the approach of an object is sensed, the shutter 14a of the slot 14 in which a magnetic commuter ticket 12 is inserted is closed to prohibit a magnetic commuter pass 14 from being put in. This avoids the aforementioned problem encountered when a passenger with a magnetic commuter pass 12 is immediately followed by a passenger with a radio commuter pass or vice versa.

As described above, the ticket information on the radio commuter pass or the magnetic commuter pass is prohibited depending on the result of sensing the approach of an object.

Specifically, the approach of an object which seems to be a radio commuter pass is sensed and only during the time when the approach of the object is being sensed, the ticket information on the radio commuter pass is taken in. During the same time, a magnetic commuter pass cannot be accepted. This makes it possible to give priority to the processing of the radio commuter pass regardless of whether the ticket information on the radio commuter pass has been read correctly. Thus, the processing based on erroneous judgment can be prevented unlike a case where even if the reading of the ticket information on the radio commuter pass is delayed, the processing of the magnetic commuter pass is performed.

While in the above embodiment, commuter passes are used, other types of tickets may be used. For instance, ordinary tickets, coupon tickets, admission tickets, prepaid cards, or credit cards may be used.

Approach-sensing timing with which the ticket information on a radio commuter pass is read, may be fixed. By changing the timing according time zones such as the rush hours, smoother operation can be effected.

Figure 7:
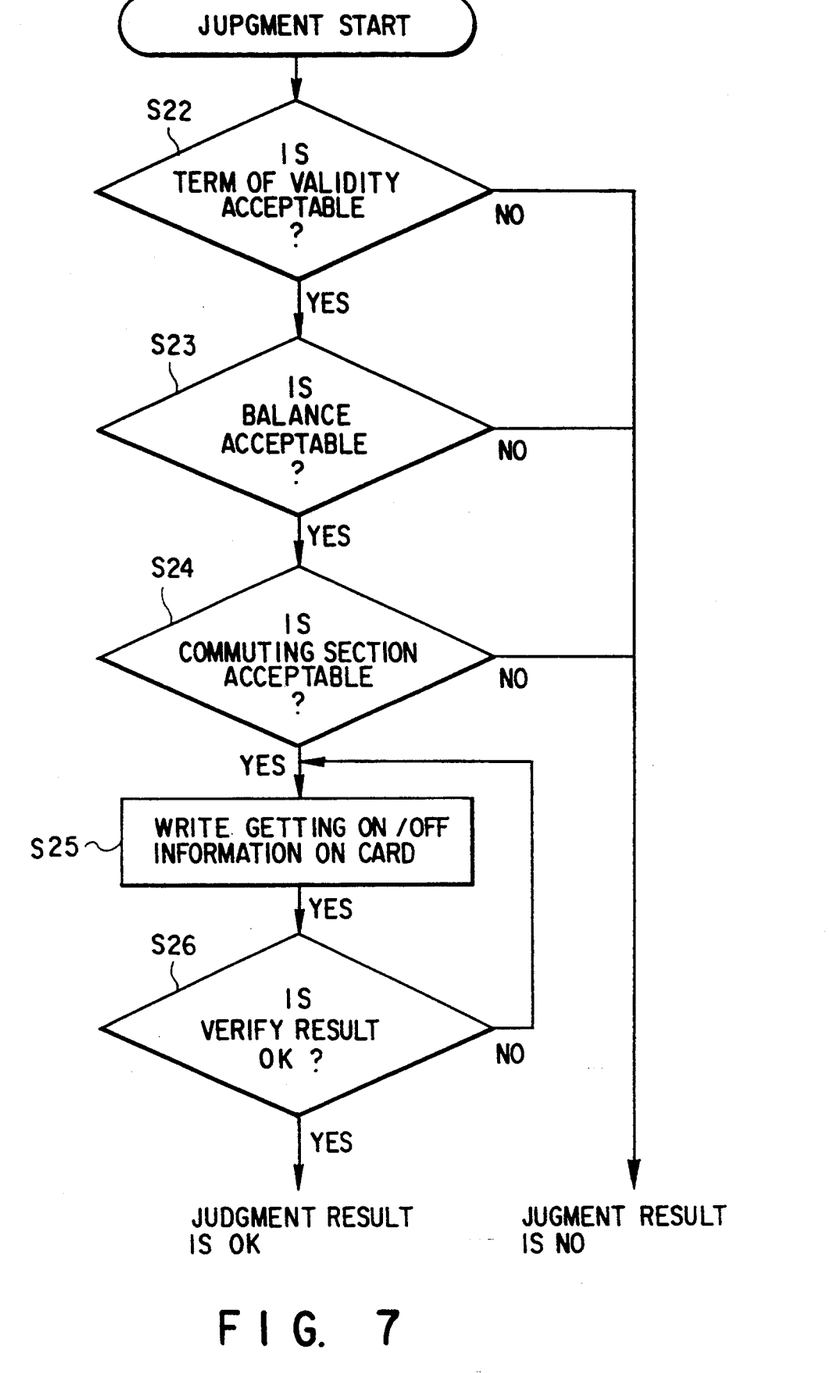
FIG. 7 is a flowchart of the judging operation in the automatic ticket-examining apparatus of the embodiment.

FIG. 7 is a flowchart for the ticket-judging operation in the automatic ticket-examining apparatus of the invention. FIG. 7 shows the details of the judging processes (steps S8 and S19) in FIG. 6. First, the term of validity (expiration date) of the commuter pass is judged (S22). Then, if the card is a prepaid card, it is judged whether or not the balance is acceptable (S23). After this, the commuting section is judged (S24). When there is no problem with these judgments, information on getting on and off is written on the card (S22) and the writing is verified (S26). If there is something wrong with any one of those items, the judgment result is NO, and the warning process in FIG. 6 is performed (S11).

Figure 8:
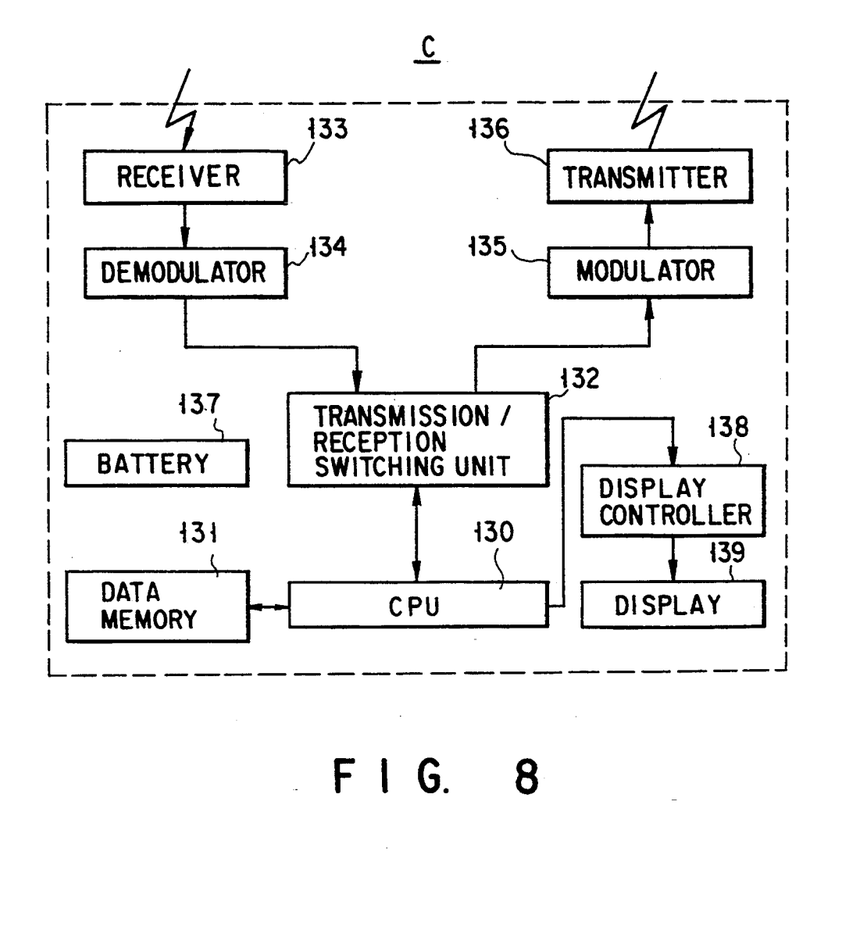
FIG. 8 is a block diagram of a radio ticket used with the automatic ticket-examining apparatus.

FIG. 8 is a block diagram of a radio ticket used with the automatic ticket-examining apparatus of the invention. A radio ticket in the figure comprises a CPU 130, a memory 131 for storing a control program and processing data, a receiver 133 for receiving a signal from the apparatus, a demodulator 134 for demodulating a signal from the receiver, a modulator 135 for modulating the signal from the memory 131 into a data signal, a transmitter 136 for transmitting the signal from the modulator 135 to the apparatus, and a battery 137 for supplying power to each unit. An LCD (Liquid Crystal Display) is used for display. The data stored in the memory 131 includes the ID code, the ticket serial number, the commuting section, the term of validity, sex, child or adult, and the number of past passes through the automatic ticket-examining apparatus, for example. These units are formed in IC chips, which are arranged on a single card-like board.

This invention may be practiced or embodied in still other ways without departing from the spirit or essential character thereof.

As described in detail, with the present invention, it is possible to provide an automatic ticket-examining apparatus capable of reliably performing the processing according to types of cards and ensuring a stable operation.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An automatic gate apparatus for processing a first medium and a second medium, the first medium storing first information to pass said automatic gate apparatus, the second medium storing second information to pass said automatic gate apparatus, the first information being read by contacting with said automatic gate apparatus and the second information being transmitted by not contacting with said automatic gate apparatus, said automatic gate apparatus comprising:

a slot for accepting the first medium to read the first information;

means for sensing existence of the second medium;

means for obstructing said slot not to accept the first medium in response to the sense of said sensing means; and means for receiving the second information from the second medium in response to the sense of said sensing means by not contacting with the second medium.

2. A medium processing apparatus comprising:

means for accepting a magnetic medium which records magnetic information indicative of utility section and period;

means for reading the first information from the magnetic medium by contacting with the magnetic medium;

means for receiving second information indicative of utility section and period from a radio medium without contact with the radio medium;

means for processing the information on the basis of the first information or the second information;

means for sensing existence of the radio medium; and means for obstructing the acceptance of the magnetic medium to be accepted by said accepting means when the sensing means has sensed the existence of the radio medium.

3. A medium processing apparatus according to claim 1, further comprising means for performing a specified process on the basis of the second information on the radio medium when the sensing means has sensed the existence of the radio medium, and performing the specified process on the basis of the first information on the magnetic medium when the sensing means has not sensed the existence.

4. A medium processing apparatus according to claim 1, further comprising a shutter, provided as part of the accepting means, for obstructing the magnetic medium from being taken in.

5. A medium processing apparatus according to claim 1, further comprising a gate for blocking the passage and advance of a person according to the result of the processing means.

6. A medium processing apparatus according to claim 1, further comprising means for transmitting information onto the radio medium in response to the process of the processing means.

7. A medium processing apparatus according to claim 1, further comprising means for writing information onto the magnetic medium in response to the process of the processing means.

8. A medium processing apparatus according to claim 1, further comprising means for displaying whether or not the receiving means receives the second information from the radio medium.

9. A medium processing apparatus according to claim 4, further comprising means for storing reference information, means for detecting a predetermined relationship between the reference information and the first information on the magnetic medium and the radio information on the radio medium and means for control the gate in accordance with the detection.

10. A medium processing apparatus comprising:
means for accepting a magnetic medium having magnetic information of utility section and period;
means for reading the magnetic information from the magnetic medium by contacting with the magnetic medium;
means for receiving second information from a radio medium without contact with the radio medium;
means for sensing the existence of the radio medium;
means for performing a specified process on the basis of the second information on the radio medium when the sensing means has sensed the existence of the radio medium, and performing the specified process on the basis of the first information on the magnetic medium when the sensing means has not sensed the existence;
means for obstructing the acceptance of the accepting means when the sensing means has sensed the approach of the radio medium; and
means for blocking the passage and advance of a person according to the result of the processing means.

11. A medium processing apparatus according to claim 10, further comprising:
means for storing reference information;
means for detecting a predetermined relationship between the reference information and the first information on the magnetic medium and the second information on the radio medium;
means for writing specified information onto the magnetic medium according to the result of the detecting means; and
means for writing specified information onto the radio medium according to the result of the detecting means.

12. An automatic gate apparatus, formed in an entrance or exit of a facility, for processing a first record medium which is carried by a person who use the facility, auto storing first condition for use the facility and a second record medium storing second condition for use the facility, comprising:
a body having predetermined length and passage for guiding the person to predetermined direction;
a receiving section, formed on the body, for receiving the first record medium;
means for obstructing the reception of the first record medium by the receiving section;
means, formed at rear section of the receiving section along the predetermined direction, for sensing the second record medium;
means for receiving the condition from the second medium;
means for driving the obstructing means so as to obstruct to receive the first record medium and driving the detecting means so as to start of detecting second condition when the sensing means senses the second record medium;
means for reading the condition from the first or second recording medium;
means for memorizing judging data of condition for use the facility;
means for judging whether the condition from the reading means meat the condition from the memorizing means; and
means for allowing the person to pass the passage of the body based on the result of the judging means.

* * * * *